United States Patent [19]

Deml et al.

[11] 4,172,219
[45] Oct. 23, 1979

[54] DAYLIGHT PROJECTION SCREEN AND METHOD AND APPARATUS FOR MAKING THE SAME

[75] Inventors: Reinhold Deml, Munich; Dieter Giglberger, Unterhaching; Ulrich Greis, Weyarn, all of Fed. Rep. of Germany

[73] Assignee: AGFA-Gevaert, A.G., Leverkusen, Fed. Rep. of Germany

[21] Appl. No.: 661,120

[22] Filed: Feb. 24, 1976

[30] Foreign Application Priority Data

Mar. 15, 1975 [DE] Fed. Rep. of Germany ....... 2511390

[51] Int. Cl.² ............................................. B23K 27/00
[52] U.S. Cl. ............................. 219/121 LM; 350/128
[58] Field of Search ............... 350/127, 128, 117, 123, 350/125, 105, 106; 219/121 L, 121 LM, 121 EA, 121 EM; 346/76 L

[56] References Cited

U.S. PATENT DOCUMENTS

| | | | |
|---|---|---|---|
| 2,338,654 | 1/1944 | MacNeille | 350/128 |
| 2,358,070 | 9/1944 | Holmes et al. | 350/128 |
| 3,435,186 | 3/1969 | Roshon, Jr. et al. | 219/121 L |
| 3,523,717 | 8/1970 | Glenn, Jr. | 350/128 |
| 3,560,258 | 2/1971 | Brisbane | 219/121 LM |
| 3,584,183 | 6/1971 | Chiaretta | 219/121 LM |
| 3,617,702 | 11/1971 | Flournoy | 219/121 LM X |
| 3,632,205 | 1/1972 | Marcy | 219/121 L X |
| 3,665,483 | 5/1972 | Becker et al. | 219/121 L |
| 3,704,055 | 11/1972 | Hong | 350/125 X |
| 3,769,488 | 10/1973 | Hasslinger | 219/121 LM |
| 4,000,492 | 12/1976 | Willens | 346/76 L X |

OTHER PUBLICATIONS

IBM Technical Disclosure, 219/121 L, vol. 9 #11, (1967-Apr.) by Woodward.

*Primary Examiner*—Roy N. Envall, Jr.
*Assistant Examiner*—M. H. Paschall
*Attorney, Agent, or Firm*—Michael J. Striker

[57] ABSTRACT

A layer of material which absorbs incident focussed laser light and undergoes a resultant heating is arranged in the focal plane of a lens matrix. Laser light is projected onto such layer through the lens matrix itself. The laser light is focussed by the lens elements of the lens matrix onto the layer effecting a highly localized heating of small well-defined portions of the layer. At those small well-defined portions, the material of the layer, as a result of the highly localized heating, removes itself to form the apertures of a lens-aperture matrix which is thereafter used in cooperation with the lens matrix as a rear projection or daylight projection screen.

10 Claims, 2 Drawing Figures

DAYLIGHT PROJECTION SCREEN AND METHOD AND APPARATUS FOR MAKING THE SAME

BACKGROUND OF THE INVENTION

The invention relates to a method of producing a daylight projection screen comprised of a lens matrix and a cooperating lens-aperture matrix located at least approximately in the focal plane of the lens matrix.

More particularly, the invention relates to methods of this type wherein electromagnetic radiation is projected through the lens matrix itself to produce the apertures of the lens-aperture matrix.

Still more particularly, the invention relates to such methods wherein the material which forms the lens-aperture matrix undergoes mechanical and/or chemical and/or optical changes in response to such irradiation.

We have considered the possibility of forming a daylight projection screen using a lens matrix which is coated on its back side with a photographic reversal-film emulsion. The projection screen could be formed by projecting light onto the emulsion, through the lens matrix itself, with all portions of the emulsion layer being illuminated simultaneously, and with the projection being performed in correspondence to the geometry of the projection light which will be used when projecting images using the finished screen. After the emulsion has been exposed in this way, it is developed. The development results in the formation of the fixedly secured and properly positioned lens-aperture matrix necessary for producing the requisite image contrast boost.

However, this production technique has important disadvantages. The development process needed for converting the exposed emulsion into an actual lens-aperture matrix is relatively complicated, and therefore not well suited for cheap, mass-production manufacture. Furthermore, problems are presented when the back surface of the finished projection screen is essentially comprised of a gelatin-silver emulsion. Such a material is very unstable and is easily damaged when handled, for example when the projection screen is being cleaned. On the other hand, if a further layer of transparent material is provided over the gelatin-silver emulsion, to protect it from physical damage, this turns out to detract markedly from the contrast boosting effect desired for a daylight projection screen.

SUMMARY OF THE INVENTION

It is accordingly a general object of the invention to devise a way of producing daylight projection screens which does not involve the disadvantages described above.

It is a more particular object to devise a method of making a daylight projection screen which is less complicated than the method described above.

It is another object of the invention to devise a method of making a daylight projection screen which results in a screen which is itself superior to the screens which can be produced using the method described above.

These objects, and others which will become more understandable from the description, below, of preferred embodiments, can be met if the daylight projection screen is produced using for the electromagnetic radiation a beam of laser light, with the laser light being focussed onto a layer of material which is highly absorptive of the laser light energy, undergoes a resultant intense and highly localized heating and then either removes itself to form the requisite apertures or undergoes physical or other changes which can be utilized in the formation of the apertures.

If laser light is focussed onto the surface of a material which is highly absorptive of the laser light energy, to produce a highly localized energy incidence of high concentration, a very intense, but extremely localized heating of the surface of the material will occur. Depending upon the particular material employed, the very intense, but extremely localized heating will cause a very small, well-defined portion of the material to melt, evaporate or sublime. The portion so effected can be kept very small and well defined by preventing the set-in of thermal equilibrium between the well-defined portion upon which the laser light is focussed, on the one hand, and the material surrounding such well-defined portion, on the other hand. This is accomplished by utilizing very short exposure times in combination with very high power densities, so that the very intense, but extremely localized heating, and accordingly the resulting change of state, occurs virtually adiabatically. Specifically, this kind of sudden, highly localized vaporization of the material of the exposed layer results in the thermomechanical removal of very well-defined portions of the material of the layer—i.e., so as to create the desired lens aperture.

Advantageously according to the invention, the daylight projection screen is comprised of a lens matrix the back side of which is provided with a layer of material, preferably in the form of a coating, which is highly absorptive of the energy of the incident focussed laser light, which undergoes a resultant heating, and which in response to such heating readily undergoes a change of condition (e.g., change of state) of a type useful in the formation of the required lens apertures. The layer in question can be made of any of the well known opaque materials which are removable by laser energy, such as opaque pigments, lacquers, synthetic resins, amorphous metals and metal compounds, various synthetic plastic materials well known to have the characteristics in question, and also agglomerations and combinations of such substances in the form of layers of flakes, granules, bristles, etc.

The layer of laser-light-energy-absorptive material can be applied to the back of the lens matrix in any of many conventional ways, e.g., by spraying, pouring, dipping, or by chemical, electrolytic, electrophoretic or electrostatic deposition procedures.

The amount of laser-light energy which need be consumed to produce the apertures of the lens-aperture matrix can be reduced by using a light-energy-absorptive layer comprised of a plurality of sub-layers. For example, use can be made of a first-sub-layer of a material which is very highly absorptive of the laser light energy and which in response to the resultant localized heating very readily sublimes and/or vaporizes. A second sub-layer, between which and the back of the lens matrix the first sub-layer would be sandwiched, would be made of a material of high mechanical and chemical strength and stability. This second layer serves to protect the first layer from damage, thereby making possible the use for the first layer materials which although otherwise desirable may be somewhat delicate. Also, the second layer is advantageously highly absorptive of light in the visible spectrum, i.e., it is dark, which makes it possible to use for the first layer materials which although otherwise desirable are not of themselves dark enough to provide the desired degree of contrast boost.

With this two-sub-layer arrangement, the very intense but highly localized heating of well-defined portions of the first sub-layer results in adiabatic vaporization and/or sublimation of those portions; as a result, the corresponding well-defined portions of the second sublayer immediately back of the vaporized portions of the first sub-layer are mechanically blown off or pop off, in consequence of the localized pressure surge produced by the vaporizing material.

The first or intermediate sub-layer is advantageously made of a material which readily vaporizes, such as collodion, various well known alkyl acids, peroxides and the like. The second mechanically stable layer is advantageously a black inked lacquer, a black-dyed synthetic plastic material, or the like, of suitable mechanical stability.

According to another advantageous concept of the invention, light-diffusing means is provided intermediate the back side of the lens matrix and the layer forming the lens-aperture matrix. The provision of such light-diffusing means is accomplished particularly easily by simply roughening the surface of the back side of the lens matrix to a slight degree. This produces a limited scattering of the projected light and, accordingly, the equivalent of an increased aperture size for the lens-lens-aperture system. As will be understood by persons skilled in the art, this increases the viewing angle within which a person viewing the projection screen can observe the image projected thereon.

In principle, it would be possible to simultaneously illuminate with laser light all portions of the aperture-matrix-forming layer which are to be illuminated. However, this creates certain problems concerning the size and power of the laser beam which would be needed. According to a further advantageous concept of the invention, use is made of a laser beam of relatively small cross-sectional area—i.e., capable of illuminating only a fraction of the entire layer at any one moment—but of very high power density. The laser beam is deflected, preferably using a cardanic deflecting mirror, and made to scan or cover all portions of the lens matrix, and thereby the aperture spots of the aperture matrix, not simultaneously but in succession. In order that the finished lens-aperture matrix be of a geometry suitable for use with the light which will be used to project images onto it, the laser-beam-deflection procedure is advantageously carried out in such a manner that the geometry of the subsequently employed projection light is maintained—i.e., if one selects any particular portion of the lens matrix, both the laser light incident upon that portion during production of the projection screen and also the projection light incident upon that portion during subsequent use of the finished screen, will be incident along approximately the same line.

The size of the apertures to be formed can be controlled, within certain limits of controllability, by selecting the speed of movement of the deflecting mirror (i.e., the duration of exposure to laser light) and by selecting the power density of the laser light employed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
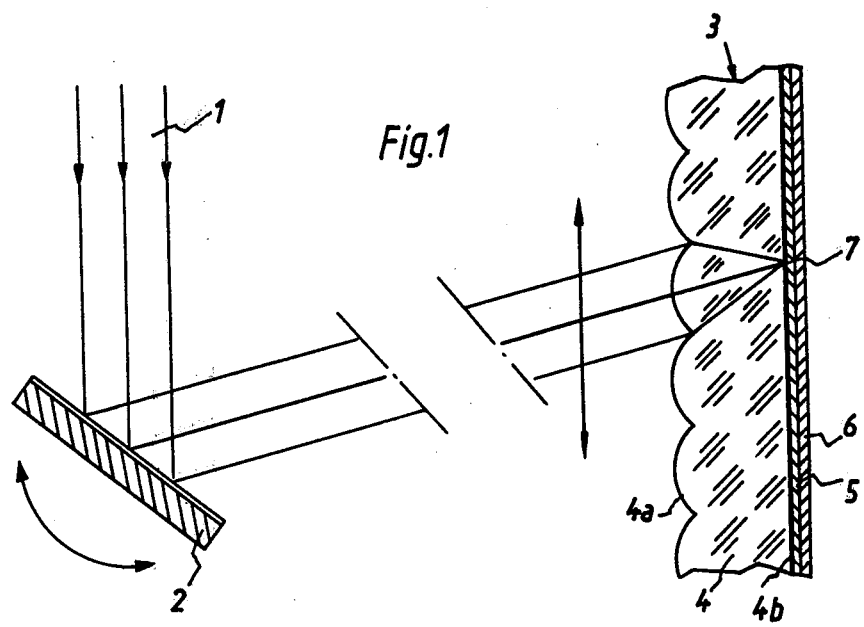
FIG. 1 depicts in schematic manner how the method of the invention is performed.

In FIG. 1, a cardanic deflecting mirror 2 is systematically controlled (by non-illustrated control means) to deflect laser light 1 from a (non-illustrated) source of laser light onto successive portions of an unfinished projection screen 3. The unfinished projection screen 3 is comprised of a transparent body 4 of synthetic plastic material the left side of which is formed of a plurality of spherical portions, arranged in a two-dimensional array, to form the lens elements 4a of a lens matrix. The right side of synthetic plastic body 4 has a plane mat surface 4b. Surface 4b is coated with a first sublayer 5 made of collodion, and sub-layer 5 is in turn coated with a second sub-layer 6 made of a black-dyed mat lacquer.

To actually produce the apertures of the aperture matrix, the laser beam 1 is systematically deflected (for example under the control of a cam) to scan each element of the lens matrix in succession. The lens elements 4a focus the incident laser light onto first sub-layer 5. Due to the high energy density developed at the focal point 7 of the lens element in question, the material of first sub-layer 5 (collodion) at this point suddenly vaporizes. This results in the sudden development of an extremely localized very high pressure which blows off a corresponding well-defined portion of the layer 6 located directly behind point 7.

Figure 2:
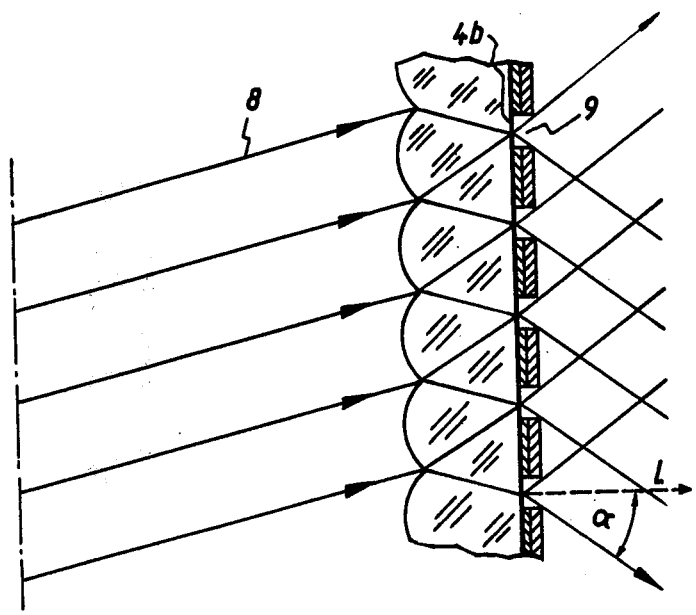
FIG. 2 depicts, likewise in schematic manner, the use of the finished daylight projection screen.

The finished projection screen is shown schematically in FIG. 2. Its lens apertures 9 coincide with the convergence points of the incidence projection light 8. To a limited extent, the projection light 8 is scattered at the mat surface 4b. This makes for an increase in the viewing angle alpha, which is measured relative to a normal L to the screen. The viewing angle alpha is the angle within which the image projected onto the screen can be viewed.

It will be understood that each of the elements described above, or two or more together, may also find a useful application in other types of constructions, procedures and apparatus differing from the types described above.

While the invention has been illustrated and described as embodied in a method of producing a particular projection screen, such screen itself and a particular apparatus for producing such screen, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and described to be protected by Letters Patent is set forth in the appended claims:

1. A method of producing a daylight projection screen comprised of a lens matrix and a cooperating lens aperture matrix arranged at the focal plane of the lens matrix, comprising, in combination, the steps of using for the lens matrix a first layer of optical material provided on its front side with portions constituting the individual lens elements of the lens matrix; using for the lens-aperture matrix a second layer of material which absorbs incident focussed laser light and undergoes a resultant heating resulting in removal of the material of the layer; and forming the lens-aperture openings of the lens-aperture matrix by effecting localized heating and thereby removal of the material of the second layer at those locations where lens-aperture openings are to be formed by focussing laser light onto the second layer through the lens matrix with the second layer fixed in position on the back side of the lens matrix.

2. The method defined in claim 1, using as the second layer a layer including a first and a second sub-layer, the first sub-layer being intermediate the second sub-layer and the back side of the lens matrix, the first sub-layer being of a material which absorbs incident focussed laser light and undergoes a resultant heating, the second sub-layer being of a material which absorbs light within the visible spectrum so as to appear dark and which furthermore is less susceptible to physical damage than the material of the first sub-layer, wherein the forming of the lens-aperture openings comprises effecting localized heating of the material of the first sub-layer at those locations where lens-aperture openings are to be formed by focussing laser light onto the first sub-layer through the lens matrix and effecting such heating to an extent resulting in the removal of the material of the second sub-layer at such locations.

3. The method defined in claim 2, wherein the effecting of the heating to an extent resulting in the removal of the material of the second sub-layer at the locations at which the apertures are to be formed comprises heating the material of the first locations to an extent causing such material at those locations to undergo a sudden change into the vapor state causing the material of the second sub-layer at such locations to be blown off thereby forming the apertures of the lens-aperture matrix.

4. The method defined in claim 1, further comprising modifying the structure of at least one component of the projection screen to establish a light diffusing action intermediate the lens matrix and the layer used for the lens-aperture matrix.

5. The method defined in claim 1, including roughening the back side of the lens matrix to an extent sufficient to establish a light diffusing action intermediate the lens matrix and the layer used for the lens-aperture matrix.

6. The method defined in claim 1, wherein the focussing of the laser light onto the material of the second layer at those locations where lens-aperture openings are to be formed comprises projecting laser light onto all said locations in succession from a laser light source through the lens matrix using an intermediate deflecting means.

7. A day light projection screen, comprising, in combination, a lens matrix comprised of a first layer of optical material provided on its front side with portions constituting the individual lens elements of the lens matrix; and a cooperating lens-aperture matrix arranged at the focal plane of the lens matrix, the lens-aperture matrix being comprised of a second layer of a material which absorbs incident focussed laser light and undergoes a resultant heating resulting in removal of the material of the second layer, the apertures of the lens-aperture matrix being formed by effecting localized heating and thereby removal of the material of the second layer at those locations where lens-aperture openings are to be formed by focussing laser light onto the second layer through the lens matrix with the second layer fixed in position on the back side of the lens matrix.

8. The daylight projection screen defined in claim 7, the apertured second layer being comprised of identically apertured second sub-layers, the first sub-layer being located intermediate the second sub-layer and the back side of the lens matrix, the first sub-layer being of a material which absorbs incident focussed laser light and undergoes a resultant localized heating, the second sub-layer being of a material which in response to such localized heating removes itself to form a lens-aperture opening, the material of the second sub-layer furthermore being absorptive of light within the visible spectrum so as to appear dark and being less susceptible to physical damage than the material of the first sub-layer so as to protect the latter.

9. The daylight projection screen defined in claim 8, the geometry of the screen intermediate the lens matrix and the apertured second layer on the back side of the lens matrix being light-diffusing.

10. The daylight projection screen defined in claim 9, the surface of the back side of the lens matrix being rough enough to produce a light-diffusing action.

* * * * *